Dec. 7, 1954  E. DOMINGO  2,696,193
VACUUM LINE WITH TRAP FOR MILKING MACHINES
Original Filed July 9, 1948
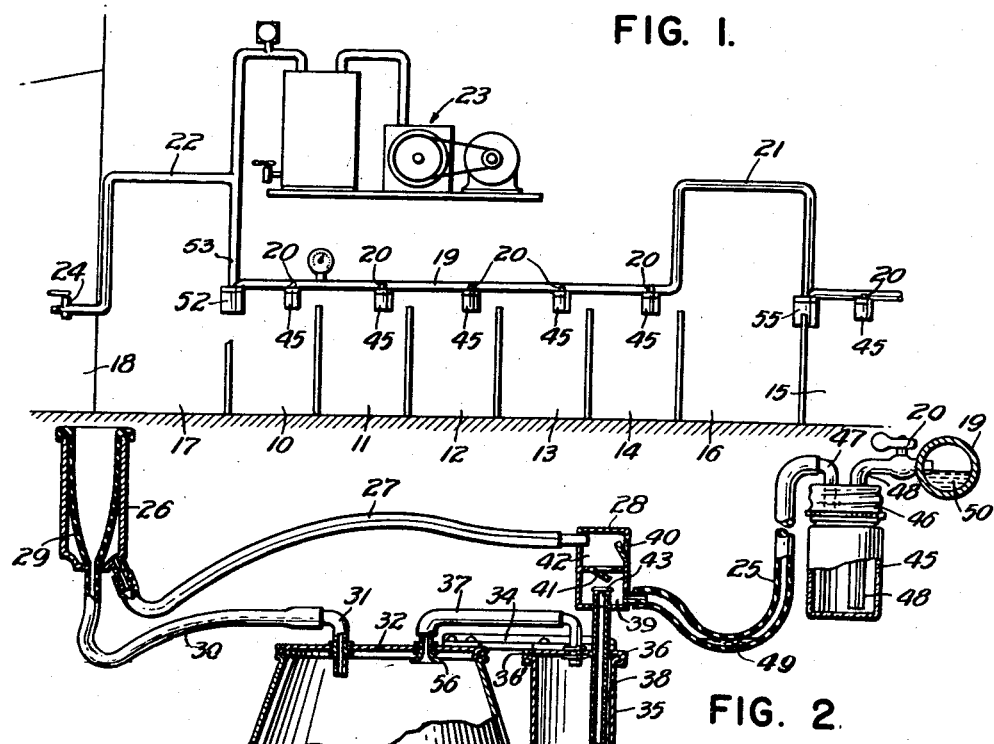
FIG. 1.
FIG. 2.
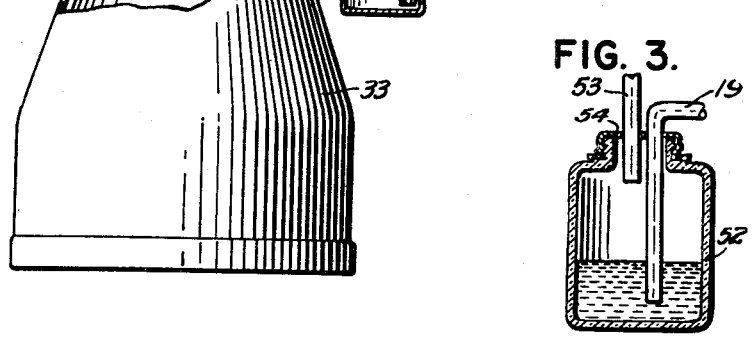
FIG. 3.
Inventor
Emil Domingo
By George H. Mitchell, Jr.

Patented Dec. 7, 1954

2,696,193

VACUUM LINE WITH TRAP FOR MILKING MACHINES

Emil Domingo, New York, N. Y.

Original application July 9, 1948, Serial No. 37,909. Divided and this application March 2, 1951, Serial No. 213,510

1 Claim. (Cl. 119—14.01)

My invention relates to milking apparatus of the character disclosed in my copending application, Serial No. 37,909, filed July 9, 1948, of which this is a divisional application.

Although there are many types of vacuum-operated milking machines in wide use, there seems to be the common failing that each system permits contaminated drippings from the vacuum lines, from the air hose, from the rubber inflation, from the pulsator, and from other parts of the system to fall into the milk, thereby impairing the quality of the milk and in many cases providing a health hazard for the consumer.

It is, accordingly, an object of the invention to provide an improved milking apparatus wherein the above-indicated possible sources of contamination may be completely eliminated, so that higher quality milk may be more consistently obtained and so that health hazards may be substantially reduced.

It is another object to provide an improved milking apparatus wherein drippings cannot accumulate to a dangerous extent in the vacuum lines.

It is an object to meet the above objects with a simple apparatus in which a clear visual check may be made of such drippings as may be accumulated in critical parts of the vacuum system.

It is a specific object to provide a milking system meeting the above objects and at the same time employing as much as possible of the equipment now in use, whereby minimum modification need be involved.

Other objects, and various further features of the invention will be pointed out or will occur to those skilled in the art from a reading of the following specification in conjunction with the accompanying drawings. In said drawings, which show, for illustrative purposes only, a preferred form of the invention:

Fig. 1 is a more or less diagrammatic view of a part of a milk barn in which there is installed a vacuum-operated system incorporating features of the invention;

Fig. 2 is an enlarged view in partial section of a milking apparatus, which may be one of a number connected to the system of Fig. 1;

Fig. 3 is a fragmentary enlarged sectional view of another part of the system of Fig. 1;

Briefly stated, my invention contemplates the employment of suitable trap means in a vacuum-operated milking system for assuring that there can be no return flow of drippings or other fluid accumulations from the vacuum end or from the air-inlet end of the system back into the milk pail. In the forms to be described, I may employ such trap means in the normal vacuum connection between the pulsator and the milk pail as is described and claimed in my copending application Serial No. 37,909. Further trap means may be installed between the vacuum line and the connection to the pulsator so as to prevent the direct flow of fluid accumulations in said line back to the milk pail.

Referring to Figs. 1 and 2 of the drawings, I show my invention as applied to a vacuum system installed in a milk house having plurality of stanchion positions or stations 10-11-12-13-14-15. These positions may be arranged in groups, such as the group of stanchion positions 10 through 14, and the groups may be separated by cross walks, such as the cross walk 16 between stanchion positions 14-15. At an end of the milk house there may be another cross walk 17 adjacent and leading to a milk-cooler shed or room 18. All stanchion positions 10 through 15 may be supplied by a common vacuum line or pipe 19 extending generally horizontally and including a cock 20 with a suitable outlet or fitting at each stanchion position, for operation of the milking apparatus at each particular stanchion location. At the cross walks 16-17, the vacuum line 19 may be raised, as at 21-22, in order to permit sufficient head clearance, and the vacuum line 19 may be evacuated by conventional pumping equipment 23; In the form shown, the raised pipe connection 22 supplies an additional cock 24 in the milk shed or cooler 18, for use of the vacuum supply in cleaning certain parts of the apparatus.

At any particular stanchion position the milking apparatus may be more or less conventional and may be operated by a removable rubber-hose connection to the open end of the vacuum outlet, as guarded by the cock 20. For purposes of simplicity, the milking apparatus is shown in Fig. 2 to include only one teat cup 26 having a direct inflation-hose connection 27 to a pulsator 28 and containing a rubber inflation 29 with a direct milk connection 30 to a milk-inlet fitting 31, carried by the cover 32 of a milk pail 33. The pulsator unit 28 may include a customary check valve 43. To complete the system there is a vacuum connection between the supply line 19 and the interior of the milk pail 33, and in the forms shown this connection is by way of the vacuum chamber or chest of the pulsator 28.

In accordance with a feature of the invention described and claimed in my copending application Serial No. 37,909, I provide trap means between the milk pail 33 on one side, and the pulsator 28, inflation hose 27, vacuum hose 25, and check valve 43. In the form shown in Fig. 2 this trap is supported by bracket means 34 secured to the milk-pail cover 32. The trap may include a vessel 35 preferably removably secured, as by a bayonet fit, to a cover 36 carried by the bracket 34. A first connection 37 to the trap may extend from the inside of the top of the cover 32 to the inside of the top of the trap. A second connection 38 to the trap preferably extends to a lower part of the trap and connects said lower part with the vacuum chest 39 of the pulsator 28. The trap vessel 35 and its cover or closure 36 may be sealed by suitable gasket means 36.

It may here be noted that the pulsator 28 is shown only schematically because such devices are well known and in wide use. It will be understood that the vacuum chest 39 is constantly exposed to the vacuum line and that appropriately interlocked and cooperating valve means 40-41 may alternately expose a second chest 42 within the pulsator 28 first to an evacuated pressure and then to atmospheric pressure in order to achieve the desired operation of the rubber inflation 29; the alternating cycle between these pressures may recur at a steady rate of 50 to 60 pulsations per minute. If a check valve is to be employed in the system, it is preferably located at a level above the level at which the connection 38 may draw fluid from the trap chamber 35, and also above the level at which the flexible vacuum hose 25 is connected to the pulsator vacuum chest 39; in the form of Fig. 2, a check-valve member 43 is seated within the lower pulsator chest 39 and the upper end of the evacuating connection 38.

In accordance with a feature of the present invention, further trap means may be employed between the vacuum line 19 and the vacuum connection of the pulsator 28, and such trap means may conveniently be mounted and held at the connection of the air cock 20 to the line 19. Again, I prefer that a part of the trap be removable, and in the form shown I employ a glass jar 45, which may be a so-called Mason canning jar, so that clear observation may be had of any accumulation of fluids in the jar 45. For convenience, the cover 46 for the jar 45 may be of metal and fixedly mounted at a stanchion outlet. The cover 46 may carry an inlet fitting 47 and a pipe 48 connected to the cock 20 and extending to a lower part of the bottle or jar 45. The inlet connection 47 preferably discharges into jar 45 at a level well above the level at which the pipe 48 may draw fluid from the jar 45.

Normally, fluids which may include milk, condensation products, dirt, and contaminated solids may accumulate in various parts of the described system. One source of such accumulations may be attributed to the alternate evacuation and pressurizing of the inflation hose 27, as a result of which action the interspace between the rubber inflation 29 and the teat cup 26 may accumulate dirt and condensation drippings. Eventually, these drippings may find their way back down the inflation hose 27 and into the upper chamber 42 of the pulsator 28. Naturally, these drippings can then fall back through the valve 41 whenever the valve 41 is open, and they may then accumulate around the check valve 43 in the lower pulsator chamber 39. With each pulsing cycle of the pulsator, the check valve 43 may be momentarily unseated, and, were it not for the trap means which I have devised, small but dangerous quantities of the described contaminated fluid could flow into the pipe 38, only to drip directly into the milk pail 33. It will be understood that with my trap, however, the drippings may be discharged into the vessel 35 for subsequent removal down the rubber hose 25 by suction.

Normally, the rubber-hose connection 25 from the pulsator 28 to the stanchion vacuum outlet will, due to its length and weight, be flexed downward before rising to the stanchion-outlet connection. This dip from the outlet of the pulsator may provide another location for the accumulation of dangerously contaminated fluids, as indicated schematically by the reference numeral 49. Further contaminated fluids, including contaminated milk that may have been pumped into the vacuum-supply system when a pail 33 was allowed to become too full, may accumulate in the vacuum-supply pipe 19 itself, and the level of such an accumulation of fluid is schematically indicated at 50.

Now, it frequently occurs in the operation of a milk house, with equipment such as that which has been described, that a vacuum hose, such as the hose 25, is carelessly removed from a stanchion connection or cock 20 without shutting off the cock. Such careless removal will be understood immediately to collapse the vacuum so as to admit atmospheric air into the vacuum line 19. If this carelessness should have occurred, say, at the stanchion position 14, it will be appreciated that there may be such a rush of atmospheric air into the vacuum system as to pick up the fluid 50 within the vacuum line 19 and completely to fill the pipe 19 with such fluid. The fluid will then be rapidly sucked in a wave down the vacuum line 19 and towards the pumping apparatus 23. As the wave of fluid created by this disturbance passes successive stanchion outlets, say the outlet for the stanchion position 12, there is opportunity for a substantial flow of fluid back toward the pail 33 at the stanchion position 12, and, were it not for my provision of the traps 45, such flow could occur. It will be understood, however, that a trap 45 may be of sufficient capacity (a one-quart glass canning jar is preferred, for its ready availability at most farm houses) to contain all the fluid 50 that may be forced into the apparatus at the stanchion position 12 by a disturbance of the character indicated. The same safety feature may be said to characterize the trap 45 at each of the succeeding stanchion positions 11—10, and it will be appreciated that all traps 45 may be adequate to contain any onrush of contaminated fluid.

For emphasis, I have indicated how carelessness may be the cause of the pumping fluids into the various milking equipments, for entrapment in traps 45. The implication may be that traps 45 are useful primarily as a precaution against carelessness, but this is certainly not the case. The same type of disturbance may also arise under the most carefully controlled circumstances whenever another milk pail is connected to the vacuum line 19, for it will be appreciated that until the interior of the pail 33 (and other parts of each equipment) is evacuated, there is a relatively large supply of air at atmospheric pressure available to disturb the fluids in line 19 when the cock 20 is opened.

Upon restoration of a steady vacuum in line 19, there may be an oversupply of fluid 50 in the vacuum line 19. To anticipate this eventuality I provide, in accordance with another feature of the invention, for automatically drawing off this excessive fluid. In Fig. 3, I show how a further trap 52 may be included in the vacuum line 19 at the pump end of the group of stanchion outlets 20. The vacuum line 19 may be bent downwardly and fixedly secured to a cover 54 from which the trap 52 may be readily removed, and an exhaust connection 53 to the vacuum pump 23 may also be secured to the cover 54. To facilitate inspection of accumulations in the trap vesesl 52, I prefer that this vessel be a glass jar and, for the size installation shown, a standard gallon bottle with a screw-cap mouth may be perfectly adequate.

Should the indicated type of disturbance occur in the stanchion group which begins with stanchion position 15, it will be appreciated as being desirable that such disturbance should not reflect upon operation of the milking apparatus in use at one or more of the stanchion positions 10—14. To offset the effects of such a disturbance a further trap 55 like the trap 52 may be installed in the vacuum line just before the rise 21 over the cross walk 16. In this manner, it will be clear that each group of stanchion positions may be served by the same vacuum line while drip accumulations in the line for each bank of stanchion positions may be held to a minimum.

It will be appreciated that I have described an ingenious but relatively simple improvement for milking apparatus. The improvement may provide assured isolation of the fresh milk from a number of sources of contamination, thus not only making possible the maintenance of consistently high quality in the collected milk but also reducing a health hazard. My improved system provides a means for draining contaminated accumulations so that these accumulations may not become dangerously large, and a visual check of the accumulations is at all times possible. Perhaps the most important feature of the improvement is its ready adaptability to existing systems with little or no structural change.

While I have described my invention in detail for the preferred forms shown, it will be understood that modifications may be made within the scope of the invention as defined in the appended claim.

I claim:

In a vacuum pail-type milking machine system including a vacuum pump, a vacuum pipe line connected to the suction side of said pump and running the length of a row of stalls, a plurality of stanchion hoses adapted to be detachably connected at intervals to the pipe line for supplying vacuum to a plurality of milking machines, and stall cocks for controlling communication between the pipe line and said stanchion hoses, the improvement which comprises a trap means operatively connected to the pipe line intermediate said line and each stanchion hose, said trap means comprising a receptacle, a cover member therefor, and inlet and outlet tubes depending from said cover member into said receptacle and communicating with a stanchion hose and said pipe line, respectively, the relative length and the arrangement of said tubes being such that said trap means is operative to induce flow of milk drawn into said stanchion hose to the pipe line and positively to prevent backflow of said milk or liquid impurities from said pipe line to said stanchion hose.

References Cited in the file of this patent

UNITED STATES PATENTS

| Number | Name | Date |
| --- | --- | --- |
| 1,398,230 | Hall | Nov. 29, 1921 |
| 1,559,315 | Daysh | Oct. 27, 1925 |
| 1,718,822 | Hulbert | June 25, 1929 |
| 2,451,456 | Rawson | Oct. 12, 1948 |
| 2,456,276 | Harstick | Dec. 14, 1948 |

FOREIGN PATENTS

| Number | Country | Date |
| --- | --- | --- |
| 595,875 | Great Britain | Dec. 19, 1947 |